Jan. 30, 1968     K. J. HECKER     3,366,735
EDGE SIGNAL CIRCUIT FOR AUTOMATIC TRACKING SYSTEM WHICH
GENERATES EDGE SIGNALS FOR EDGES AT ANY ANGLE TO THE
DIRECTION OF THE SCANNING LINES
Filed Aug. 17, 1964
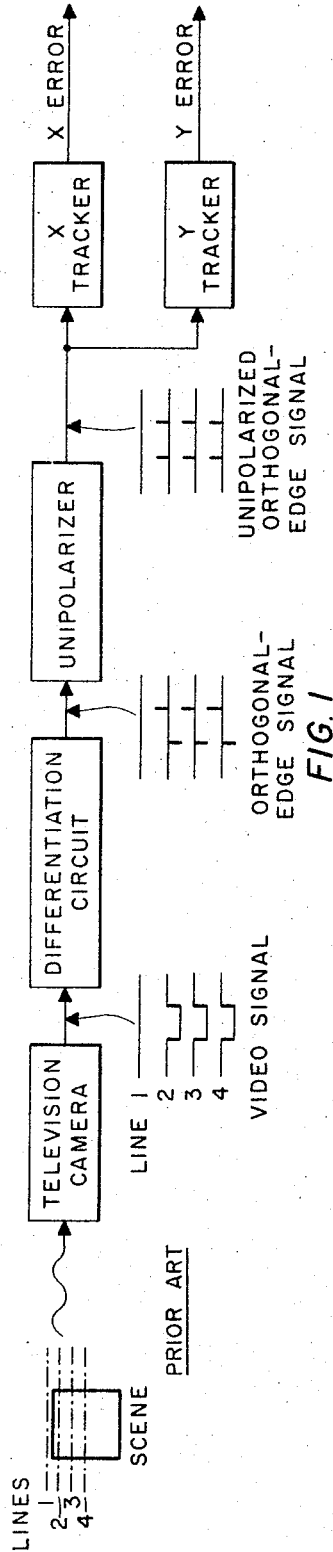
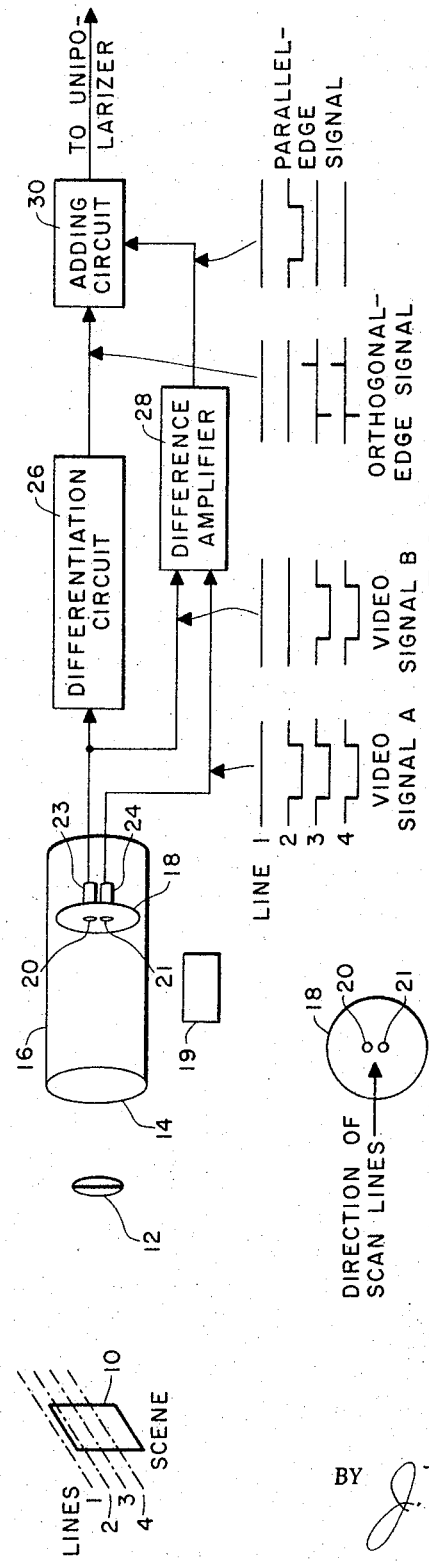
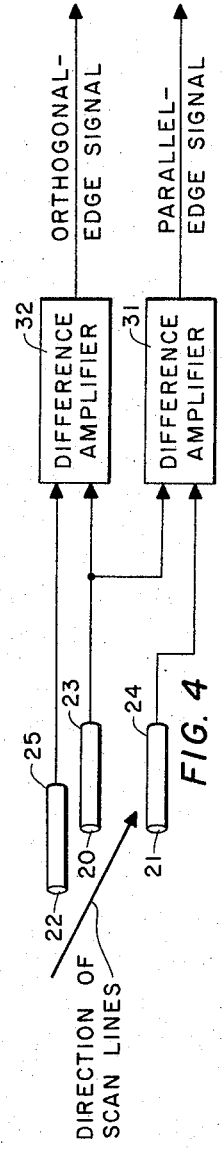
KLAUS J. HECKER
INVENTOR.
BY
ATTORNEY

# United States Patent Office 3,366,735
Patented Jan. 30, 1968

3,366,735
EDGE SIGNAL CIRCUIT FOR AUTOMATIC TRACKING SYSTEM WHICH GENERATES EDGE SIGNALS FOR EDGES AT ANY ANGLE TO THE DIRECTION OF THE SCANNING LINES
Klaus J. Hecker, Riverside, Calif., assignor to the United States of America as represented by the Secretary of the Navy
Filed Aug. 17, 1964, Ser. No. 390,248
6 Claims. (Cl. 178—7.2)

ABSTRACT OF THE DISCLOSURE

An electronic circuit for a television scan-type tracking system to generate edge signals independent of their slope with respect to scan direction, including an image dissector having two apertures to provide tracking information from two successive scanning lines.

---

The invention herein described may be manufactured and used by or for the Government of the United States of America for governmental purposes without the payment of any royalties thereon or therefor.

The present invention relates to an improvement in the electronic circuitry of a television-type tracker for tracking systems and more particularly to an electronic circuit which permits generation of edge signals in automatic television-type trackers for edges which are parallel to the direction of the scanning lines.

Conventional television-type tracking systems commonly make use of edge signals obtained from the electronic signal representing the image (see FIG. 1). These signals are tracked by conventional radar tracking techniques. Edge signals are obtained in a differentiation circuit such as a simple high-pass filter or an operational amplifier with proper feedback to obtain differentiation. In order to obtain equal signals from dark/bright and bright/dark edges the signal usually is unipolarized (two-way rectified) before it is fed to the tracking circuits. This method, however, cannot provide any edge signal for edges which are parallel to the direction of the scanning lines. Furthermore, since the circuit generates an edge signal only for the components of the edge which are orthogonal to the direction of the scanning lines, edges which are sloped less with respect to the scan direction will produce signals of lower amplitude and in a smaller number of lines, than signals of edges which are sloped more. The difference between the signals obtained from the different-slope edges can cause different tracking response and/or reliability in the two dimensions.

In the present invention edge signals are produced which are independent of their slope with respect to the scan direction, and this is provided by an image dissector having two closely spaced aperture holes. Information from two successive scanning lines is provided at the outputs of a pair of electron multipliers and processed in output channels to give correct X and Y tracking information on bright/dark and dark/bright changes scanned.

It is an object of the invention; therefore, to provide an improvement in the electronic circuitry of a television-type tracker.

Another object of the invention is to provide an electronic circuit for use with automatic television-type trackers to generate edge signals for edges which are parallel to the direction of scanning lines.

A further object of the invention is to provide an electronic circuit for television-type tracking systems which produce edge signals that are independent of their slope with respect to scan direction.

Other objects and many of the attendant advantages of this invention will become readily appreciated as the same becomes better understood by reference to the following detailed description when considered in connection with the accompanying drawings wherein:

FIG. 1 shows a block diagram of a conventional edge signal circuit for television-type automatic trackers.

FIG. 2 is a schematic diagram of an edge signal circuit of the instant invention.

FIG. 3 is a diagrammatic sketch of a plan view of an aperture plate used in the image dissector of FIG. 2.

FIG. 4 is a diagram showing an alternate arrangement of the circuit of FIG. 2 using two difference amplifiers and omitting the differentiation circuit.

The operation of conventional television-type tracking systems that make use of edge signals from the electronic signal representing the image, as shown in FIG. 1, has been described above.

The circuit of the present invention has the capability of producing edge signals which are independent of their slope with respect to the scan direction. Edges can be physical edges of objects or the outlines of shadows and the like, or may result from changes in coloring or brightness of an object. The edges can occur in any direction with respect to the direction of the scanning lines of a television system. These edges can have two components, one which is orthogonal to and one which is parallel to the scanning lines.

Edge signals are electronic signals which correspond to the aforementioned edges in features of an optical image, and are analogous to an ordinary video signal which corresponds to the brightness of features of an optical image. Edge component signals correspond to the aforementioned parallel or orthogonal edge components. In conventional television-type tracking systems only the orthogonal edge component is used, and this is obtained by differentiating the video signal. The present invention, however, provides a system which permits the obtaining of electronic signals corresponding to both the orthogonal and parallel edge components.

In the diagram of the circuit of the present invention shown in FIG. 2, scene 10 (comprising lines 1, 2, 3 and 4) is imaged via optics 12 onto the photocathode 14 of an image dissector 16. Photocathode 14 releases electrons, which are imaged onto aperture plate 18 in a conventional well-known manner. This electron image is deflected by a deflection means 19 in a conventional fashion. Deflection means 19 can be located inside or outside image dissector tube 16. It is well known within the art, that image dissectors can be outfitted with more than one aperture hole and the required electron multipliers. The image dissector used in the present circuit has two aperture holes, 20 and 21, in plate 18, FIGS. 2 and 3, connected to two electron multipliers 23 and 24. The two aperture holes 20 and 21 are closely spaced and the deflection system 19 is operated to provide information from two consecutive scanning lines simultaneously at the outputs of the two electron multipliers 23 and 24. The image dissector tube can also include image intensification means and image magnifying or demagnifying means.

One of these outputs, such as the output from electron multiplier 23, can be used in a differentiation circuit 26 to provide an edge signal for edge components which are orthogonal to the scan direction. A typical differentiation circuit is found in the text, Computers: Their Operation and Application, by Berkeley and Wainwright, Reinhold Publishing Corp., 1956, page 109. To obtain an edge signal of the edge components which are parallel to the scan lines, the outputs of both electron multipliers 23 and 24 are fed to a difference amplifier 28. Many suitable difference amplifier circuits can be found in the text Differential Amplifiers by R. D. Middlebrook, John Wiley & Sons, Inc., 1963, a basic circuit being found on page 92. If the signal from both multipliers is equal the output of difference amplifier 28 will be zero. However, if the signals from the two multipliers are not equal (i.e. if a brightness change occurs between the scanning lines caused by edge components parallel to the scan direction), the output of the difference amplifier will not be zero. Hence, the output of difference amplifier 28 is a function of the change in brightness caused by edges in the direction parallel to the scan direction, similar to the output of differentiation circuit 26 which is a function of edges orthogonal to the scan direction.

These two edge signals may be added using a conventional adding circuit 30 and then unipolarized (two-way rectified) in any well-known manner. Alternately, the two edge signals can be unipolarized separately. Since separate tracking circuits are used for the tracking action in the scan direction and orthogonal to it, the signals may be used separately in the respective tracking circuits.

In FIG. 4 is shown the principle of an alternate arrangement which also will give edge signals in both dimensions. In this embodiment three aperture holes 20, 21 and 22 are provided in the image dissector arranged in an L-shaped fashion with respective required electron multipliers 23, 24 and 25, and two difference amplifiers 31 and 32 are used instead of one difference amplifier and a differentiation circuit as in the embodiment of FIG. 2. The output of electron multiplier 23 is fed to both difference amplifiers 31 and 32. The output of electron multiplier 24 is fed to difference amplifier 31 and the output of electron multiplier 25 is fed to difference amplifier 32. Preferably two of the aperture holes would be in a line parallel to the scan direction and at the same time two of the apertures would be in a line orthogonal to the scan direction, as shown in FIG. 4. However, this L-shaped arrangement of aperture holes could be positioned at a different angle than as shown in the drawing. The difference signal obtained from difference amplifier 31 will provide the signal for edges parallel to the scan direction, while the output from difference amplifier 32 will provide signals for edges orthogonal to the scan direction. Other arrangements of hole/difference amplifier combinations are also possible.

Obviously many modifications and variations of the present invention are possible in the light of the above teachings. It is therefore to be understood that within the scope of the appended claims the invention may be practiced otherwise than as specifically described.

What is claimed is:

1. An electronic circuit for use with video type scan in a television tracking system to provide an output signal responsive to the scanning of bright-dark and dark-bright edge portions of an image comprising:
    (a) an image dissector having a photocathode, an aperture plate with at least two aperture holes therein, and an equal number of electron multipliers, one of said electron multipliers connected to each of said aperture holes on the opposite side thereof from said photocathode.
    (b) deflection means for deflecting electron images imaged on said aperture plate by electrons emitted from said photocathode corresponding to scenes viewed thereby,
    (c) said aperture holes being closely spaced and said deflection means deflecting electron images such that electrons passing through said aperture holes to said electron multipliers during scanning produce information from two consecutive scanning lines simultaneously at the outputs of said electron multipliers,
    (d) circuit means to which the outputs from said electron multipliers are fed to produce an edge signal which is a function of edge components of the image that are orthogonal to the scan direction and an edge signal which is a function of edge components of the image that are parallel to the scan direction.

2. An electronic circuit for use with video type scan in a television tracking system to provide an output signal responsive to the scanning of bright-dark and dark-bright edge portions of an image comprising:
    (a) an image dissector having a photocathode, an aperture plate with two aperture holes therein, and an equal number of electron multipliers, one of said electron multipliers connected to each of said aperture holes on the opposite side thereof from said photocathode,
    (b) deflection means for deflecting electron images imaged on said aperture plate by electrons emitted from said photocathode corresponding to scenes viewed thereby,
    (c) said aperture holes being closely spaced and said deflection means deflecting electron images such that electrons passing through said aperture holes to said electron multipliers during scanning produce information from two consecutive scanning lines simultaneously at the outputs of said electron multipliers,
    (d) a differentiation circuit,
    (e) the output from one of said electron multipliers being fed to said differentiation circuit, said differentiation circuit providing an edge signal which is a function of edge components of an image that are orthogonal to the scan direction,
    (f) a difference amplifier,
    (g) the outputs of both said electron multipliers being fed to said difference amplifier, said difference amplifier providing an edge signal which is a function of edge components of the image that are parallel to the scan direction,
    (h) where the outputs of said electron multipliers are equal, the output of said difference amplifier will be zero; and where the outputs of said electron multipliers are different, the output of said difference amplifier will be a value other than zero, thus the output of said difference amplifier is a function of change in brightness caused by edge components parallel to scan direction.

3. A system as in claim 2 wherein said two aperture holes are in a line orthogonal to the scan direction.

4. A system as the claim 2 wherein the outputs of said differentiation circuit and difference amplifier are fed to and added by adding circuit means.

5. An electronic circuit for use with video type scan in a television tracking system to provide an output signal responsive to the scanning of bright-dark and dark-bright edge portions of an image comprising:
    (a) an image dissector having a photocathode, an aperture plate with three aperture holes therein and an equal number of electron multipliers, one of said electron multipliers connected to each of said aperture holes on the opposite side thereof from said photocathode,
    (b) deflection means for deflecting electron images imaged on said aperture plate by electrons emitted from said photocathode corresponding to scenes viewed thereby,
    (c) said aperture holes being closely spaced and said deflection means deflecting electron images such that electrons passing through said aperture holes to said electron multipliers during scanning produce information from two consecutive scanning lines simultaneously at the outputs of said electron multipliers,
    (d) said aperture holes being arranged in an L-shaped configuration,
    (e) two difference amplifiers,
    (f) the outputs of a first and second of the electron multipliers being fed to one difference amplifier, said one difference amplifier providing an edge signal which is a function of image edge components that are orthognal to the scan direction, (g) the outputs of the second and third of the electron multipliers being fed to the other of said difference amplifiers, said other difference amplifier providing an edge signal which is a function of image edge components that are parallel to the scan direction.

6. A system as in claim 5 wherein first and second aperture holes in said L-shaped arrangement are in a line orthogonal to the direction of scan and the second and third aperture holes are in a line parallel to the direction of scan.

References Cited

UNITED STATES PATENTS 3,328,761  6/1967  Yamamoto et al. ___ 340—146.3

FOREIGN PATENTS 820,283  9/1959  Great Britain.

JOHN W. CALDWELL, *Primary Examiner.*

R. K. ECKERT, JR., *Assistant Examiner.*